United States Patent [19]
Husain et al.

[11] Patent Number: 5,143,323
[45] Date of Patent: Sep. 1, 1992

[54] AIRSHIP HANDLING SYSTEM

[76] Inventors: Farouk Husain, 24a Aberdeen Road, London, England, N5 2UH; Edwin Mowforth, 20 Blackheath Grove, Wonnersh, Surrey, England, GU5 0PU

[21] Appl. No.: 539,608

[22] Filed: Jun. 18, 1990

[30] Foreign Application Priority Data

Jul. 28, 1986 [GB] United Kingdom ............... 8618319

[51] Int. Cl.$^5$ .................................................. B64F 1/12
[52] U.S. Cl. .................................. 244/116; 244/115; 244/110 E
[58] Field of Search ................... 244/115, 116, 110 E, 244/127

[56] References Cited

U.S. PATENT DOCUMENTS

| | | | |
|---|---|---|---|
| 1,351,931 | 9/1920 | Ullmann | 244/115 |
| 1,478,747 | 12/1923 | Kinyoun | 244/110 E |
| 1,560,775 | 11/1925 | Gibbons | 244/110 E |
| 1,807,710 | 6/1931 | Schleicher | 244/127 |
| 1,845,229 | 2/1932 | Bradshaw | 244/116 |
| 1,854,494 | 4/1932 | Thommes | 244/116 |
| 1,867,591 | 7/1932 | Pranke | 244/116 |
| 1,988,187 | 1/1935 | Carlotti | 244/116 |

Primary Examiner—Joseph F. Peters, Jr.
Assistant Examiner—Anne E. Bidwell
Attorney, Agent, or Firm—Edwin D. Schindler

[57] ABSTRACT

An airship handling system is disclosed. The airship handling system of the invention includes a platform which rests upon a circular track, such that the platform may be aligned with the wind in order to facilitate the handling of a suitably equipped airship. The platform incorporates an arrester gear in order to bring the airship to rest at a specified point, a mooring system to hold the airship in position for subsequent handling operations, lifts and transfer track to remove a loaded module from the airship and replace it by a second loaded module, a further lift to transfer modules between the platform and the ground level station for loading and unloading, and an accelerator gear for accelerating the airship to take-off speed within the available length of the platform.

11 Claims, 7 Drawing Sheets

AIRSHIP HANDLING SYSTEM

This application is a continuation-in-part of application Ser. No. 07/319,085, filed Feb. 22, 1989, now abandoned.

BACKGROUND OF THE INVENTION

This invention relates to a ground handling system for an airship.

The invention particularly concerns a ground handling system intended to facilitate fleet operation of passenger or cargo airships from a restricted terminal space while minimising the turn-around time.

The movement by airship of passenger streams between transport terminals, for example, near city centres or at airports involves various system requirements which include:

(i) that the airship should be of the minimum size necessary to sustain an optimum combination of fleet size and flight frequency for a given route in peak traffic density, and to operate as an economic single unit in alternative roles;

(ii) that the ground handling installation should permit operation of the airship from a limited base area, with due regard to local noise and height requirements, over an economically acceptable range of weather conditions; and (iii) that the turn-round time in peak operation should be kept to a minimum.

Current proposals operating "heavy" helium-filled airships include two basic techniques:

(a) dynamic operation from a runway similar to aeroplane take off and landing. This method requires considerable space, and time is lost in backtracking to the take-off point. Operation in turbulence is however helped by the availability, through considerable forward speed, of adequate aerodynamic control throughout the approach and climb-out phases;

(b) vertical or near-vertical approach and climb-out using vectored thrust. This dramatically reduces the base area requirement, but position control on vertical thrust is difficult in rough conditions, particularly when the mean wind speed is low, due to the ineffectiveness of the control services. The vectored thrust installation also represents additional weight and cost.

In both cases, the time taken to load and unload passengers is a significant factor in the turn-round time, especially where the lack of ballast or hold-down facilities requires a "one-in, one-out" sequence.

The present invention provides a swivelling landing platform. The platform can be aligned to suit the wind direction, and incorporates arrester and accelerator systems such that the air speed of the air ship on approach and climb-out can be maintained at a sufficient magnitude both to ensure positive aerodynamic control and to sustain dynamically a reasonable under-capacity load without the use of vectored thrust. The platform further embodies a module handling system for the exchange of loaded passenger modules, so that the turn-round time may be considerably reduced.

DETAILED DESCRIPTION OF THE ILLUSTRATED EMBODIMENT

Figure 1:
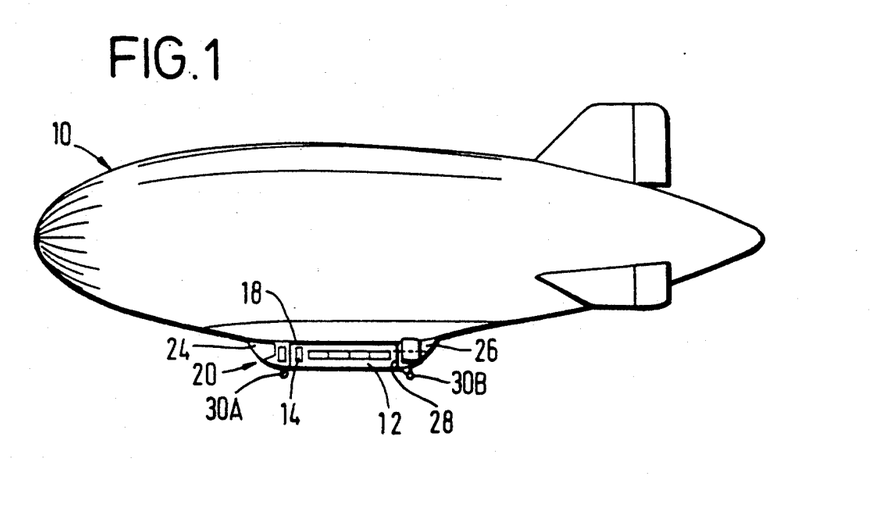
FIG. 1 is a side view of an airship for use with the present invention.
Figure 10:
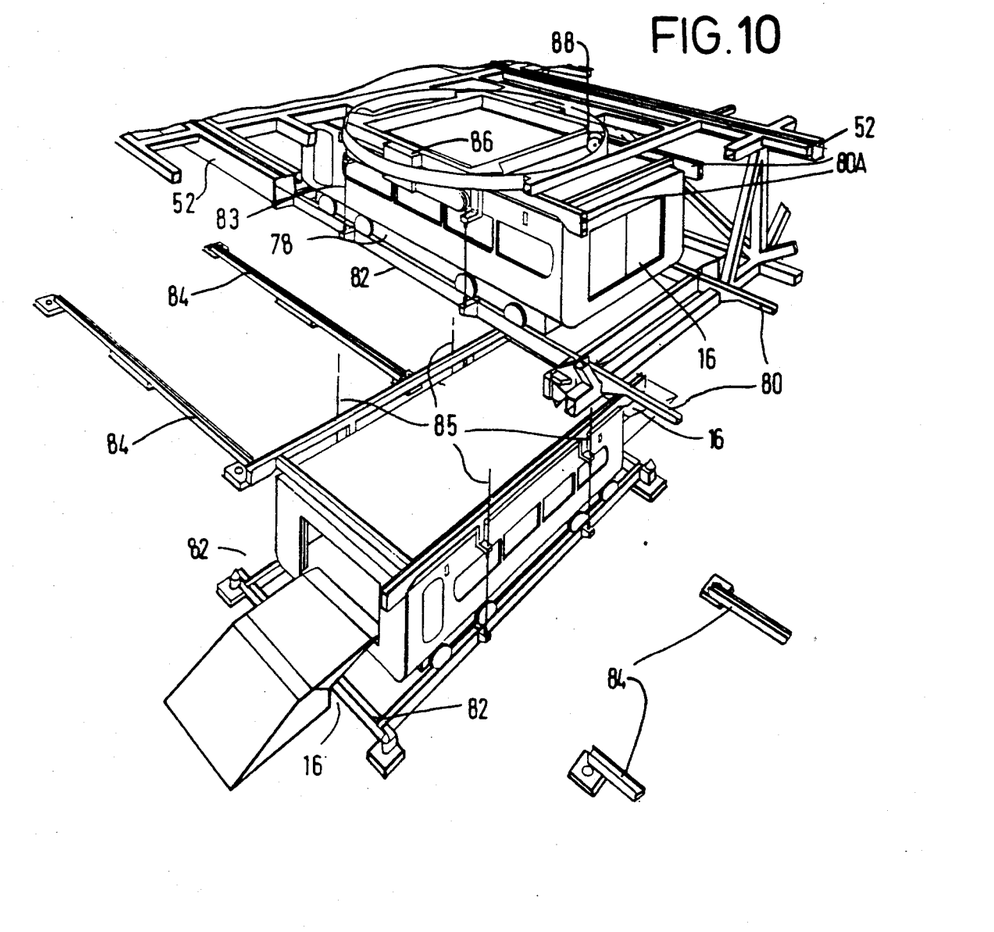

FIG. 1 shows an airship 10 adapted for use with the system of the present invention. The airship is 87 meters long and has a lifting gas capacity of 22,500 cubic meters. A typical gross static lift capability is 21,000 kg. Passengers are carried in a detachable module 12. The module is 12.7 meters long and 5.0 meters wide. It is designed to carry 70 passengers in forward facing seats. The weight of the loaded module 12 is about 10 tonne. The module has a single entry side door 14 on either side and large end doors 16 in the end of the module to allow rapid entry and exit when the module is detached from the airship 10. The end doors 16 are best seen in FIG. 10.

The module 12 is cradled within a complementary recess 18 depending from a suspension frame within the superstructure 20 of the airship.

Attachment of the module 12 to the airship suspension frame is by means of a retractable latch 22 (see FIG. 11) at each corner of the top of the module 12 which engages a suitably shaped member within the recess 18. The module 12, held by the latches 22 in the recess 18, fits between a flight deck portion 24 of the superstructure and a rear fairing portion 26 of the superstructure. It is arranged that the forward end of the module 12 is in contact with the top of this suspension frame and the aft bulkhead on the flight deck 24. The dimensions of the module allow a gap of about 0.3 meters between the aft bulkhead of the module and the rear fairing 26. This is fitted with an inflatable rubber seal 28. During attachment and removal of the module 12 the seal 28 is deflated.

The flight deck 24 and the rear fairing 26 are provided with tandem caster wheels 30A and 30B. The wheels may be locked with their axes of rotation extending laterally across the airship. The forward wheels 30A are also steerable from the flight deck.

Figure 2:
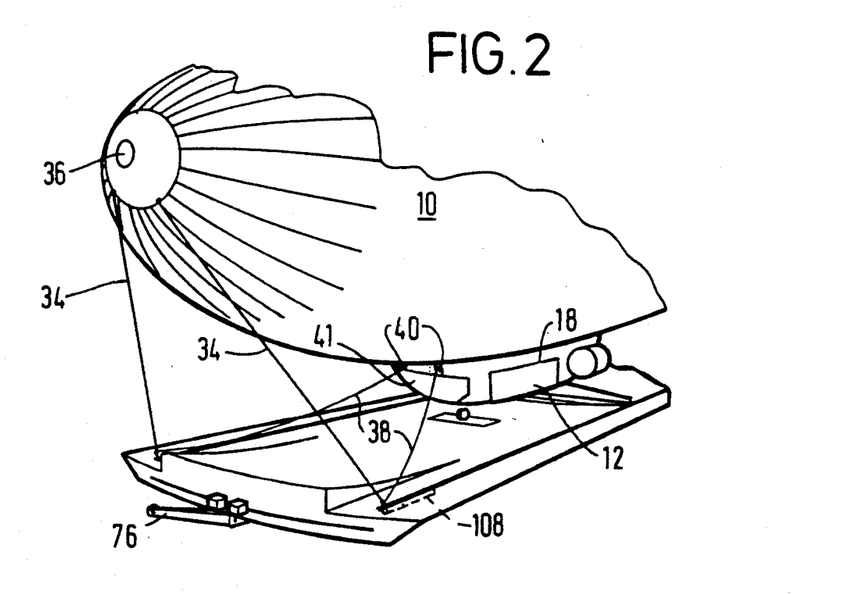
FIG. 2 is a perspective view of detail of the nose of the moored airship.

Referring to FIG. 2, two nose lines 34 are attached to a nose cone 36 of the airship. These nose lines 34 are each retained against the hull of the airship by a tether line 38 on a reel 40 mounted above the forward flight deck windshield 41. For landing, the tether lines 38 are paid out to swing the nose lines 34 forward into the mooring position.

The main mooring apparatus is provided by a central mooring latch 44 which locates forward of the rear caster wheels 30B and a mooring eye 46 behind the rear wheels for the temporary attachment of a hold-down leash 42.

Figure 3:
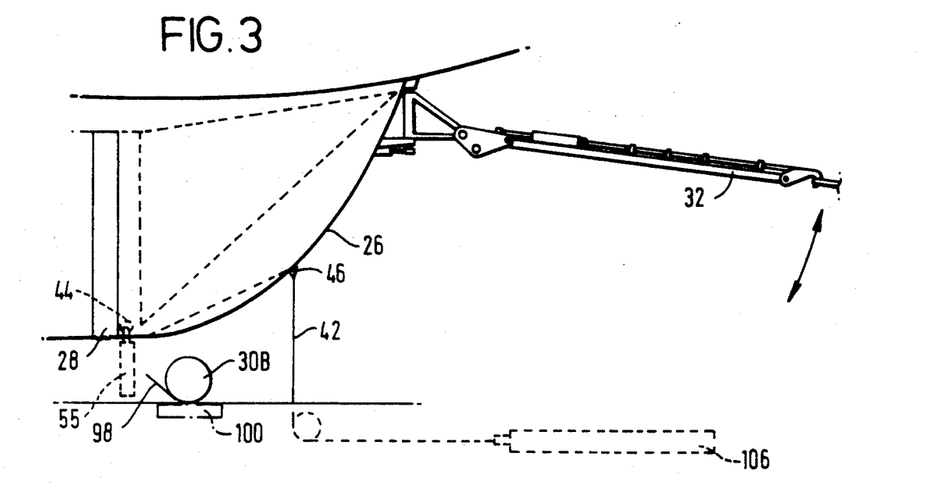
FIG. 3 is a side view of detail of the superstructure of the moored airship.

Referring to FIG. 3, aft of the rear wheels 30B, an arrester hook 32 is pivotably mounted to transmit arresting forces, when the hook is engaged, directly to the suspension frame.

Figure 4:
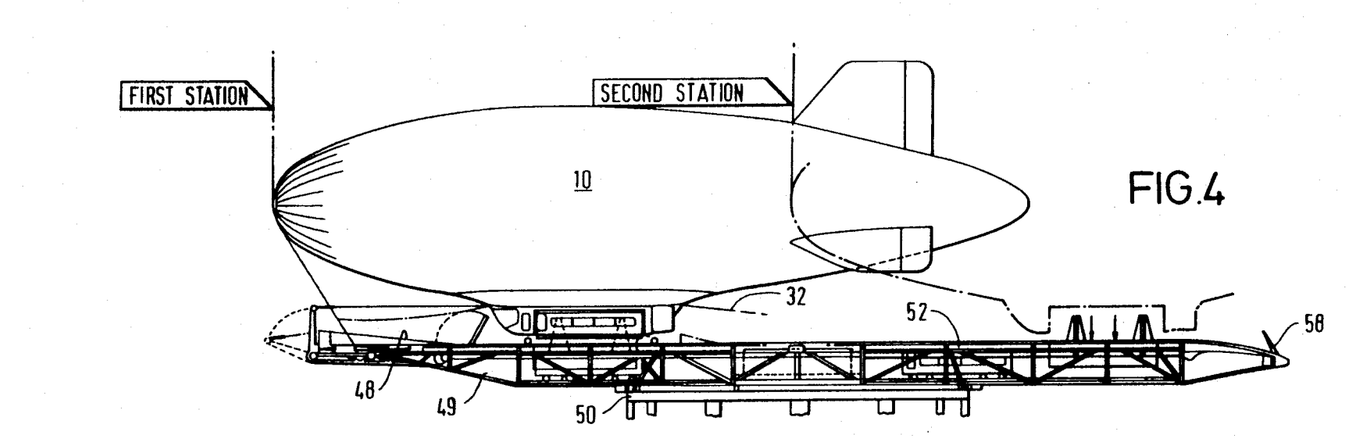
FIGS. 4 and 5 are side and plane views of the airship on a platform according to the invention.
Figure 5:
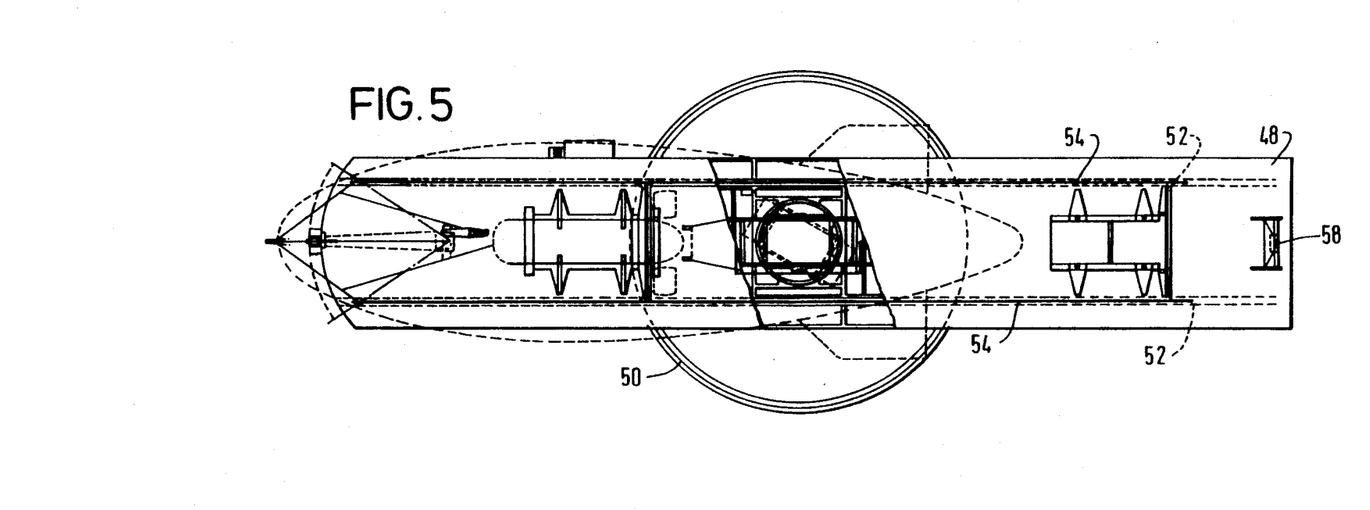

An operating platform to which the airship 10 may be moored is illustrated in FIGS. 4 and 5. A platform 48 on a frame 49, 110 meters long and 20 meters wide, is rotatably mounted on a support ring 50 which is 14 meters in diameter. The ring 50 constitutes a circular track and the frame 49 is provided with bearing wheels which support it as it is rotated on the ring 50 about the vertical axis, permitting alignment to suit a prevailing wind direction. The circular track, on which the platform rotates, is mounted upon hydraulic actuators so that the platform is able to be raised and lowered vertically in order to facilitate the adherence of the airship to an appropriate flight path on a landing approach thereof. The hydraulic actuators may act collectively, in order to raise and lower the platform vertically, or the actuators may operate differentially in order to tilt the platform about longitudinal and transverse axes thereof for the purpose of facilitating water-borne installations or installations in a vessel.

Figure 6:
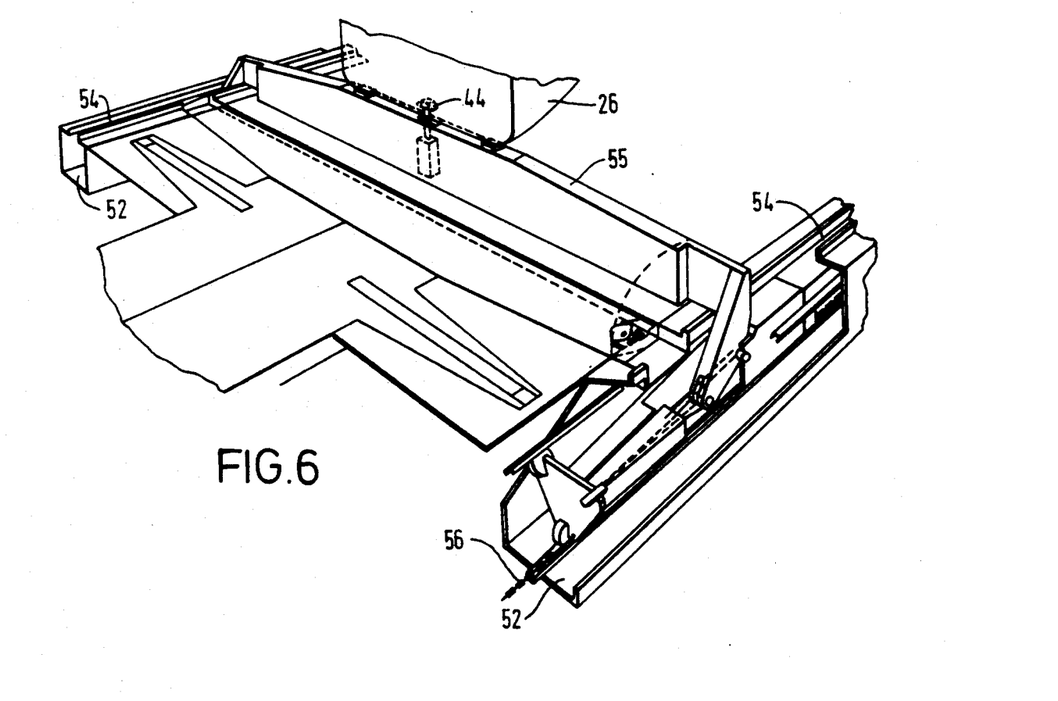
FIGS. 6, 7, 8, 9, 10, 11, 12A and 12B are more detailed views of various aspects of the platform in FIGS. 4 and 5.

Referring also to FIG. 6, the platform 48 comprises two main parallel girders 52 which are each formed with a continuous longitudinal slot 54 constituting a guide channel. A pivotable bridge arrangement 55 rides along the slots 54 on spaced tracks pulled by a continuous chain drive 56. The pivotable bridge arrangement 55 carries the mooring system latch 44 and bridge span by which the rear of the moored airship is supported and movable bodily along the platform 48. As will be seen in FIG. 6, the span of the bridge is pivotable to stand up to receive the airship for mooring or to lie flat in the plane of the deck 48 at an alloted position along the deck. The front and rear caster wheels of a moored airship bear on alignment pads which also run between the rails. The pads are described in more detail below.

Figure 7:
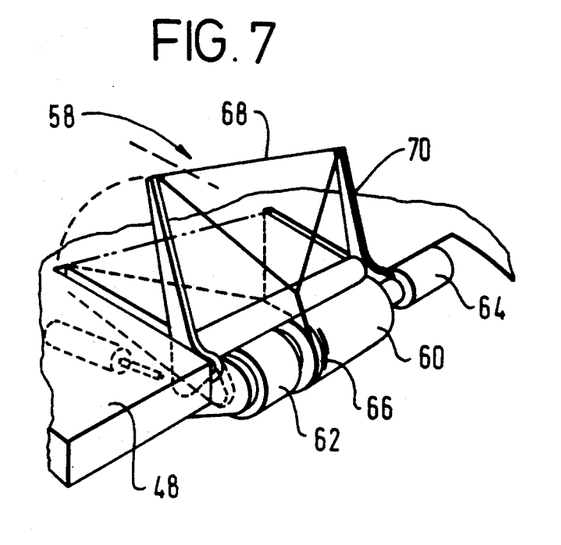

At the approach end of the platform 48 (to the right as depicted in FIG. 4) there is an arrester unit 58 (see FIG. 7) which comprises a rotatable cable drum 60 with a controllable arresting brake 62 and retrieval motor 64. An arresting cable 66 wound on the drum 60 is formed with an end loop 68 held expanded in the path of the arrester hook 32 on the landing airship by a retractable yoke 70. The yoke can be rotated out of the path of the hook 32 and into the plane of the platform 48.

Figure 8:
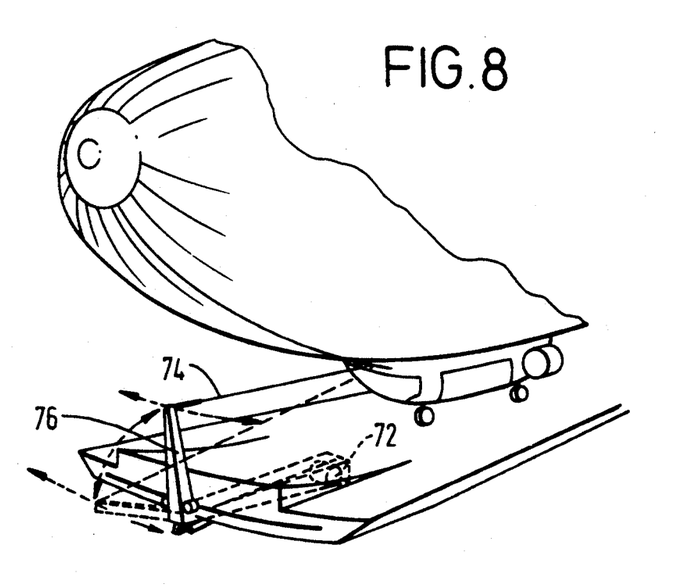

The opposite take-off end of the platform 48 comprises a similar drum and cable unit 72 (see FIG. 8) feeding a cable 74 through a single articulated boom 76. The cable is attached to the airship 10 by means of a forward hook above the windshield of the flight deck 24.

Figure 9:
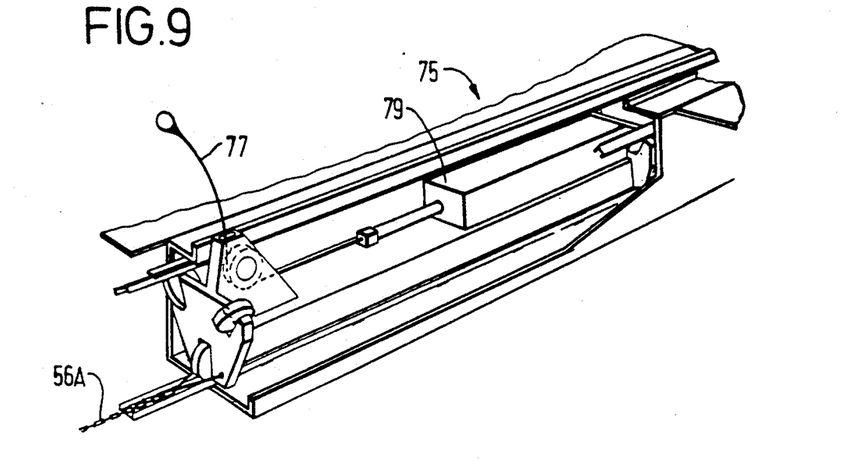

Separate from the boom 76 there is a pair of spaced nose line mooring units 75 to which the nose line 34 is attached when the airship is moored. One of the units is illustrated in FIG. 9. It comprises a tensioning jack 79 which is operable to draw in a nose line tether 77 attachable to the nose line 34 as needed. Each unit runs on its own track system pulled by a chain 56A.

The moored airship can thus be pulled along tethered to the erect bridge arrangement 55 and the nose line mooring unit 75.

Referring now to FIG. 10, the modules must be transferred between a loading concourse, away from the moored airship, and the recess 18 of the airship in which the module is held. For this purpose the detached module is movable on a powered module carriage 78 running on parallel tracks 80 within the platform frame 48 beneath the main parallel girders 52.

The module is transferable between the level of the loading concourse beneath the platform frame and the module tracks 80 within the frame by means of fore and aft hoist arrangements illustrated specifically in FIG. 10. The arrangement comprises cradle tracks 82 at concourse level onto which the module 12 is shunted from service tracks 84. When the hoist is at concourse level the module 12 may be loaded and/or unloaded by opening the large end doors 16. The cradle/module track assembly is lifted or lowered on hoist cables 85 powered by a hoist motor 86.

It will be noted that the orientation of the module 12 at concourse level when it has been shunted into a loading position is different from that at platform level. To account for this, the hoist arrangement also comprises a turntable 88 in which the hoist mechanism drive is arranged to rotate so that the correct orientation can be assumed by the module as it is lowered or raised. When the module is at platform level the raised cradle track 82 is located in alignment with the track 80 on which the module 12 can run.

During its turn-round sequence the moored airship 10 occupies a first station and then a second station. Each station (illustrated in FIGS. 13A and 13B) has a pair of centrally hinged transfer doors 90 which open beneath the recess 18 in the airship to allow transfer of a loaded module between the airship and the powered module carriage 78 running on the parallel tracks 80. The doors are opened by actuating jacks 92. When the module is aligned beneath the airship, the doors present vertically orientated screw jacks 91 which carry jacking heads 94 which carrying projections 96 which engaged recesses in the module 12. The projections 96 engage the recesses to raise the module up to the recess 18 or lower it therefrom by appropriate rotation of the screw jack mechanisms 91.

Since the airship and the passenger modules are separated during the operating sequence, it is convenient to consider the airship module cycles separately.

In preparation for landing, the platform axis is aligned with the wind by its rotation on the support ring 50, all platform installations are retracted and handling crew are waiting in areas away from the platform surface. Thus, the top of the platform presents an essentially flat surface to the incoming airship.

With the arrester hook 32 deployed, the airship approaches at a suitable speed and descent angle for touch-down. Platform sensors monitor the approach of the airship and the arrester yoke 58 is erected at the last moment only if the approach is within an acceptance window. After engagement, the cable loop 68 is pulled from the yoke and carried forward with the hook so that braking may be applied through the cable drum brake 62 to bring the airship to rest.

The rolling run along the platform deck is about 60 meters so that the airship comes to rest in about 8 seconds with an average deceleration of about 2 meters per second per second.

The nose line tethers 38 are then paid out, allowing the nose lines 34, weighted by their connectors, to swing forward. These are caught by deck crew and connected manually to the nose line tensioners 108 as the airship enters the last few meters of its run. After the front wheels have passed over the rear alignment pad a stop ramp 98 is deployed to halt the rear wheel in the correct axial position.

The airship is thus brought to rest at the first station where propulsive thrust and arrester cable tension are maintained until the mooring connections have been completed.

Figure 12A:
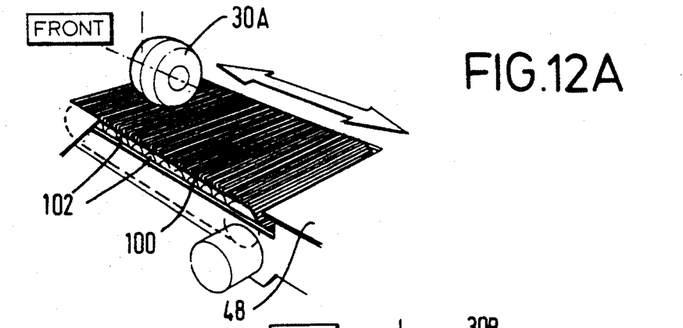
Figure 12B:
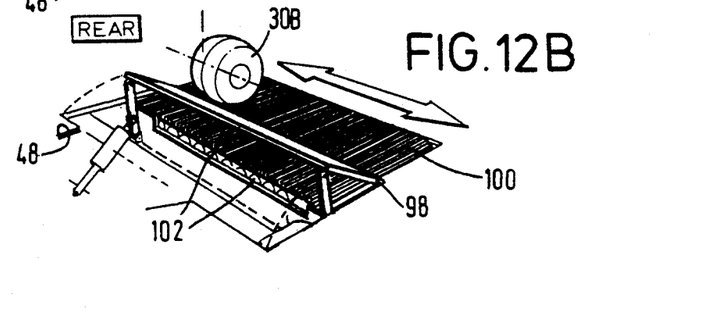

The airship wheels come to rest on the alignment pads (illustrated in FIGS. 12A and B) which are grip-surfaced belts 100 supported on multiple rollers 102 and powered to permit lateral movement of either set of landing wheels over a range of about 4 meters. The wheels are locked in the forward facing position and the hold-down leash 42 is drawn from a channel in the deck and connected manually to the leash eye 46 on the rear of the fairing 26. Tension is then applied to actuator 106 (see FIG. 3) below the deck of the platform 48 in order to keep the rear wheel in contact with its pad while nose line tensioners 108 are used to take up slack in the nose lines 34.

The alignment pads are now moved to centralise the airship on the platform, leash and nose line tensions being maintained during this adjustment. The bridge arrangement 55 is then erected and the central latch engaged to lock the rear fairing 26 firmly onto the padded bridge span.

The airship is now moored; the engines are throttled back, the stop ramp at the rear alignment pad is retracted, and the hold-down leash is disconnected.

Figure 11:
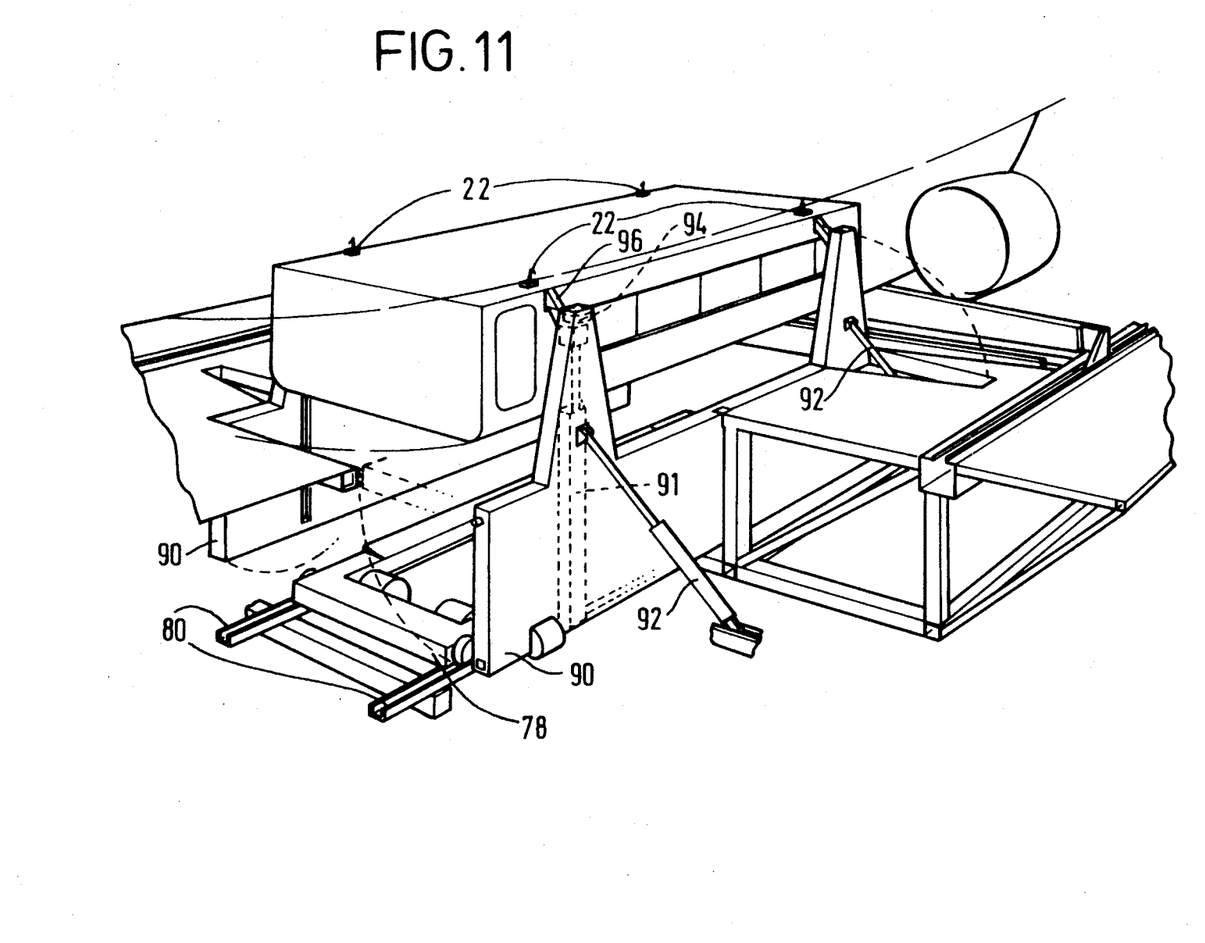

With the airship moored at the first station its passenger module may now be detached and lowered through the deck by the module transfer unit shown in FIG. 11.

The inflatable end seal 28 behind the module 12 is first deflated and the suspension latches 22 operated to lower the module out of tight engagement on the recess.

The transfer doors 90 in the deck are now opened into a verticle orientation. The pair of transfer screw jacks 91 on each side drive the transfer heads 94 to engage the brackets 96 in the recesses in the module 12 and thereby transfer its weight from the airship to the doors.

The suspension latches 22 are then fully disengaged and the screws operated to lower the module through the deck and onto the powered carriage 78 on the track 80 beneath. The airship is now "light" by about 10 tonne. The necessary vertical load to hold it down is maintained through the bridge latch arrangement and at the nose.

The accelerator hook on the cable 74 is now brought back and attached to the pick up above the windshield. The accelerator arm 76 is raised on its boom so that the cable clears the end of the platform.

The tracking chains 56 and 56A are now driven in unison to draw the airship, by means of the tethered nose lines 34 and bridge arrangement, back along the platform to the second station. During the motion the accelerator and arrester cables are respectively paid out and wound in, keeping moderate tension in each to ensure correct nesting on the cable drums and to offer additional security of mooring.

On arrival at the second station the airship is positioned over the second module transfer unit and the doors opened. The doors at the first station (the arriving module now being out of the way) are then closed. Refueling may also be effected at the second station either by hose from a fuel store within the body of the platform or by the transfer of a full fuel container into the rear fairing.

The departure module is brought into position at the second station on its carriage, and the transfer screws are operated to lift it into place in the airship recess. The suspension latches are engaged, the transfer heads withdrawn, the latches locked up in the flight position and the end seal 28 inflated. The transfer doors are then closed.

Figure 13A:
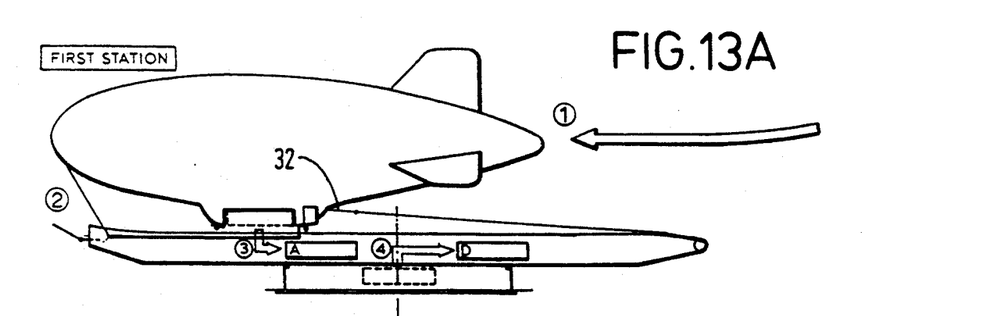
FIGS. 13A and 13B are side views illustrating the landing and take-off sequences.
Figure 13B:
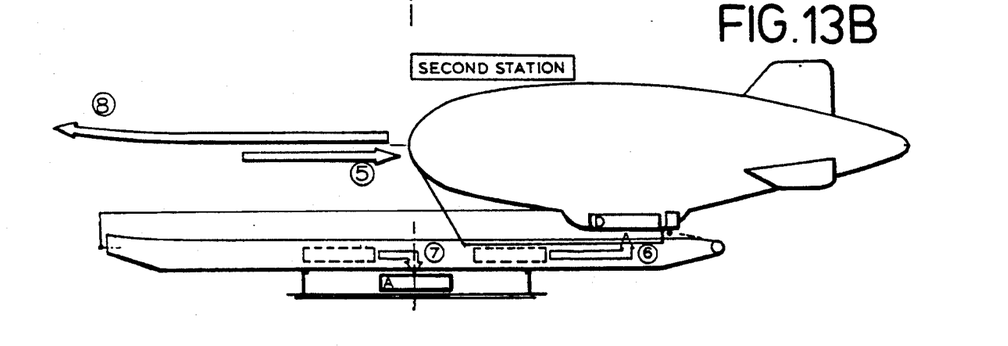

The sequence of landing, unloading an arriving module, reversing the moored airship and loading a departing module is illustrated schematically in FIGS. 13A and 13B in which the circled members indicate the sequence of positions and events.

Preparatory to take-off the bridge 55 is disengaged from the latch 44 and rotated into the plane of the deck, the nose line tensions are relaxed and the nose lines 34 are manually disconnected.

After the engines are run up to take-off power against the restraint of the arrester cable, the cable is released and the hook 32 raised to its flight position. The airship commences the take-off run with the assistance of tension in the accelerator cable 74 while at the same time winding in the nose line tethers 38 to draw back the nose lines 34 during the run.

The accelerator arm 76 is initially kept low to assist in holding the nose down, but as the first station is approached, the arm is raised to bring the cable up into a horizontal position. When the front wheels 30A begin to mount the ski jump ramp at the take-off end of the deck the cable 74 is disengaged and the arm 76 rapidly retracted.

As the airship leaves the second station, the bridge 55 is erected again and the bridge and tensioners are moved forward to the first station where the bridge is again retracted. The arrester cable loop 68 is again clipped onto the yoke 70 and tension is taken up by the drum 60 before the yoke is retracted. The system is now ready for the next incoming flight.

Referring to the module operation, passengers enter the module before it is attached to the airship and leave it after separation so that the time available for embarkation and disembarkation may be greatly extended without infringing upon the turn-around time of the airship.

Passenger transfer takes place with the module resting in a suitable concourse either below the platform as described above or at some other position connected to the hoist area by an extended module track.

Embarking passengers enter the module in the transfer concourse through the large end doors 16 in one or both ends of the module which is resting on the powered module carriage 78 supported in turn by the cradle track 80. Movement of the carriage is prevented by its own brakes and by stops raised in the track.

The cradle track is suspended from the hoist mounted on the turntable 88 in the platform so that the hoist may rotate about the same axis of the platform itself, but with independent motion. The lighter bridge track 80A is suspended by the same cables just above the module roof.

At an appropriate moment determined by the positions of the airship and the arriving module, the doors 16 are closed and the module is lifted on its cradle track, rotating as it rises to align the module axis with the platform axis.

After alignment there is a pause while the bridge track 80A registers with and latches into the gap in the module track 80 in the platform. This enables the second, unloaded module carriage to pass across from the second to the first station. Lifting then continues until locating cones and sockets engage to register the cradle track 82 with the module track 80 in the platform. The assembly is latched into place and hoist tension relaxed.

With the rolling stops retracted, the carriage can now move clear of the hoist to make room for the incoming arrival module and to take the departure module onto the transfer position at the second station when the transfer doors 90 have been opened. Module transfer then takes place as described in the corresponding section for the airship cycle.

The unloaded carriage finally crosses the bridge track during the next hoist ascent and takes up a position at the first station to receive the module from the next incoming airship.

The service track at the concourse level can be used to remove modules from the system, for example, for cleaning and servicing or for a change of duty requiring a different type of module.

The alternative forms of the system according to the present invention a single module lift can be used to handle both incoming and outgoing modules in place of the fore and aft module lifts illustrated. This will necessitate an appropriate rearrangement of the handling sequence. In another alternative form of the invention it is possible to locate module lifts below the points on the platform at which the recess in the airship is positioned for receiving a module and depositing it so that a second track for carrying the module to and from the stations A and B is not required.

It is also possible to provide the rotatable platform with further means for adjusting the tilt of the platform or raise and lower it as a whole.

Although certain preferred embodiments of the invention have been illustrated specifically, it will be understood that certain changes may be made in the above constructions without departing from the scope of the invention. It is intended that all matter contained in the above description or shown in the accompanying drawings shall be interpreted in an illustrative and not limiting sense.

It is also understood that the following claims are intended to cover all of the generic and specific features of the invention herein described.

We claim:

1. An airship handling system on which an airship would be capable of alighting and exchanging a load module, and from which said airship would be capable of take-off, said airship being adapted to receive said module for an accommodation of passages or cargo, said airship handling system comprising:
    a platform having an axis, said platform further including an arrester system arranged to engage said airship in order to bring said airship to rest on said platform in a shorter distance than would otherwise be normally practicable;
    a circular track, as a first track, upon which said platform is mounted so that said platform is capable of being turned to align its axis with a direction of a wind;
    an exchange point at which the passengers or cargo would be able to be loaded onto, and unloaded from, said load module independently of the position of said airship; and,
    means for transferring said load module between said exchange point and said airship.

2. The airship handling system according to claim 1, wherein said transferring means includes a lift which is arranged to transfer said module between said exchange point and said airship.

3. The airship handling system according to claim 1, wherein said means for transferring further includes a second track arranged to transfer said module between said airship and said lift.

4. The airship handling system according to claim 3, wherein said second track is a suspension track.

5. The airship handling system according to claim 1, further comprising a mooring system for said airship so that when said airship is moored, said airship would be capable of having a load added or removed therefrom, said mooring system further including means for moving said airship along said platform.

6. The airship handling system according to claim 1, further comprising accelerator means for accelerating said airship to a take-off speed on said platform in a shorter distance than would otherwise be normally practicable.

7. An airship handling system on which an airship would be capable of alighting and exchanging a load module, and from which said airship would be capable of take-off, said airship being adapted to receive said module for an accommodation of passengers or cargo, said airship handling system comprising:
    a platform having an axis, said platform further including an arrester system arranged to engage said airship in order to bring said airship to rest on said platform in a shorter distance than would otherwise be normally practicable;
    a circular track, as a first track, upon which said platform is mounted so that said platform is capable of being turned to align its axis with a direction of a wind;
    an exchange point at which the passengers or cargo would be able to be loaded onto, and unloaded from, said module independently of the position of said airship; and,
    means for transferring said load module between said exchange point and said airship, said transferring means including a lift.

8. The airship handling system according to claim 7, wherein said means for transferring further includes a second track arranged to transfer said module between said airship and said lift.

9. The airship handling system according to claim 8, wherein said second track is a suspension track.

10. The airship handling system according to claim 7, further comprising a mooring system for said airship so that when said airship is moored, said airship would be capable of having a load added or removed therefrom, said mooring system further including means for moving said airship along said platform.

11. The airship handling system according to claim 7, further comprising accelerator means for accelerating said airship to a take-off speed on said platform in a shorter distance than would otherwise be normally practicable.

* * * * *